(12) United States Patent
Mininni (10) Patent No.: US 7,770,439 B2
(45) Date of Patent: Aug. 10, 2010

(54) METHOD AND APPARATUS OF SCANNING A SAMPLE USING A SCANNING PROBE MICROSCOPE

(75) Inventor: Paul L. Mininni, Montreal (CA)

(73) Assignee: Veeco Instruments Inc., Plainview, NY (US)

(*) Notice: Subject to any disclaimer, the term of this patent is extended or adjusted under 35 U.S.C. 154(b) by 0 days.

(21) Appl. No.: 11/550,296

(22) Filed: Oct. 17, 2006

(65) Prior Publication Data

US 2008/0087077 A1  Apr. 17, 2008

(51) Int. Cl.
  *G01Q 10/06*  (2010.01)
  *G01Q 30/04*  (2010.01)
(52) U.S. Cl. .................. 73/105; 850/4; 850/10
(58) Field of Classification Search ............ 73/105; 250/306–307; 850/1–5, 8, 10
See application file for complete search history.

(56) References Cited

U.S. PATENT DOCUMENTS

| | | | |
|---|---|---|---|
| 5,266,801 A | 11/1993 | Elings et al. | |
| RE34,489 E | 12/1993 | Hansma et al. | |
| 5,283,442 A * | 2/1994 | Martin et al. | 250/559.22 |
| 5,329,808 A * | 7/1994 | Elings et al. | 73/105 |
| 5,331,275 A * | 7/1994 | Ozaki et al. | 324/757 |
| 5,347,854 A * | 9/1994 | Martin et al. | 73/105 |
| 5,376,790 A | 12/1994 | Linker et al. | |
| 5,412,980 A | 5/1995 | Elings et al. | |
| 5,553,487 A * | 9/1996 | Elings | 73/105 |
| 5,714,756 A * | 2/1998 | Park et al. | 250/306 |
| 5,866,806 A * | 2/1999 | Samsavar et al. | 73/105 |
| 6,000,281 A * | 12/1999 | Burke | 73/105 |
| 6,169,281 B1 | 1/2001 | Chen et al. | |
| 6,489,611 B1 * | 12/2002 | Aumond et al. | 250/306 |
| 6,545,273 B1 * | 4/2003 | Singh et al. | 250/306 |
| 6,715,346 B2 * | 4/2004 | Shuman | 73/105 |
| 6,810,354 B1 * | 10/2004 | Dahlen | 850/10 X |
| 6,816,806 B2 * | 11/2004 | Kocimski | 850/10 X |
| 6,862,921 B2 * | 3/2005 | Chand et al. | 73/105 |
| 6,910,368 B2 * | 6/2005 | Ray | 73/105 |
| 6,978,654 B2 | 12/2005 | Shuman | |
| 6,980,937 B2 * | 12/2005 | Hayes | 850/10 X |
| 7,143,005 B2 * | 11/2006 | Dahlen et al. | 250/306 |
| 7,423,269 B1 * | 9/2008 | Azordegan et al. | 250/306 X |
| 7,423,746 B2 * | 9/2008 | Takeda et al. | 250/306 X |
| 7,429,732 B2 * | 9/2008 | Kneeburg et al. | 250/306 |
| 7,498,564 B2 * | 3/2009 | Miles et al. | 250/306 X |
| 2006/0060778 A1 * | 3/2006 | Fujihira et al. | 250/309 |
| 2009/0077697 A1 * | 3/2009 | Su et al. | 850/52 |

FOREIGN PATENT DOCUMENTS

| | | |
|---|---|---|
| EP | 363983 B1 * | 9/1994 |
| EP | 1602895 A1 * | 12/2005 |
| JP | 2001338601 A * | 12/2001 |
| JP | 3485244 B2 * | 1/2004 |
| JP | 3515364 B2 * | 4/2004 |
| JP | 2006153589 A * | 6/2006 |
| WO | WO 2006102478 A2 * | 9/2006 |

* cited by examiner

*Primary Examiner*—Thomas P Noland
(74) *Attorney, Agent, or Firm*—Boyle Fredrickson, S.C.

(57) ABSTRACT

A method and apparatus of scanning a sample with a scanning probe microscope including scanning a surface of the sample according to at least one scan parameter to obtain data corresponding to the surface, and substantially automatically identifying a transition in the surface. Based on the identified transition, the sample is re-scanned. Preferably, the resultant data is amended with data obtained by re-scanning the transition.

19 Claims, 6 Drawing Sheets

METHOD AND APPARATUS OF SCANNING A SAMPLE USING A SCANNING PROBE MICROSCOPE

BACKGROUND OF THE INVENTION

1. Field of the Invention

The present invention is directed to a method and apparatus for scanning a sample using a scanning probe microscope, and more particularly, to a method and apparatus of detecting a transition region in a sample and re-scanning the transition region.

2. Description of Related Art

Several probe-based instruments monitor the interaction between a cantilever-based probe and a sample to obtain information concerning one or more characteristics of the sample. As throughput requirements increase, increased data acquisition speeds are desired, thus making the ability to obtain reliable data a challenge.

Scanning probe microscopes (SPMs), such as the atomic force microscope (AFM), are devices which typically use a sharp tip to make a local measurement of one or more properties of a sample. More particularly, SPMs typically characterize the surfaces of such small-scale sample features by monitoring the interaction between the sample and the tip of the associated probe assembly. By providing relative scanning movement between the tip and the sample, surface characteristic data and other sample-dependent data can be acquired over a particular region of the sample, and a corresponding map of the sample can be generated.

The atomic force microscope is a very popular type of SPM. The probe of the typical AFM includes a very small cantilever which is fixed to a support at its base and has a sharp probe tip attached to the opposite, free end. The probe tip is brought very near to or into direct or intermittent contact with a surface of the sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as an arrangement of strain gauges, capacitance sensors, etc. AFMs can obtain resolution down to the atomic level on a wide variety of insulating or conductive surfaces in air, liquid or vacuum by using piezoelectric scanners, optical lever deflection detectors, and very small cantilevers. Because of their resolution and versatility, AFMs are important measurement devices in many diverse fields ranging from semiconductor manufacturing to biological research.

Preferably, the probe is scanned over a surface using a high-resolution three axis scanner acting on the sample support and/or the probe. The instrument is thus capable of creating relative motion between the probe and the sample while measuring the topography or some other property of the sample as described, for example, in Hansma et al. supra; Elings et al. U.S. Pat. No. 5,226,801; and Elings et al. U.S. Pat. No. 5,412,980.

Figure 1:
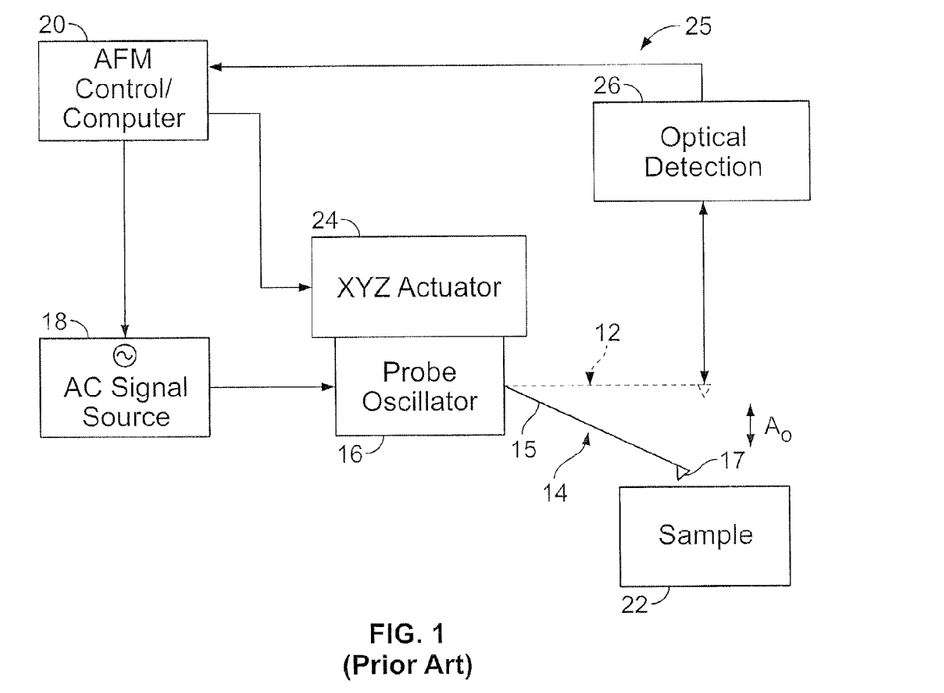
FIG. 1 is a block diagram of a prior art AFM, such as a CD-AFM.

A typical AFM system is shown schematically in FIG. 1. An AFM 10 employing a probe device 12 including a probe 14 having a cantilever 15 is coupled to an oscillating actuator or drive 16 that is used to drive probe 14 to oscillate, in this case, at or near the probe's resonant frequency. Commonly, an electronic signal is applied from an AC signal source 18 under control of an AFM controller 20 to cause actuator 16 to drive the probe 14 to oscillate, preferably at a free oscillation amplitude $A_o$. Probe 14 is typically actuated to move toward and away from sample 22 using a suitable actuator or scanner 24 controlled via feedback by controller 20. The actuator 16 may be coupled to the scanner 24 and probe 14 or may be formed integrally with the cantilever 15 of probe 14 as part of a self-actuated cantilever/probe. Moreover, though the actuator 24 is shown coupled to the probe 14, the actuator 24 may be employed to move sample 22 in three orthogonal directions as an XYZ actuator, i.e., both Z motion, and X-Y scanning motion such as in raster scanning. Still other permutations are possible.

One or more probes may be loaded into the AFM and the AFM may be equipped to select one of several loaded probes. Typically, the selected probe 14 is oscillated and brought into interaction with sample 22 as sample characteristics are monitored by detecting changes in one or more characteristics of the oscillation of probe 14, as described above. In this regard, a deflection detection apparatus 17 is typically employed to direct a beam towards the backside of probe 14, the beam then being reflected towards a detector 26, such as a four quadrant photodetector. As the beam translates across detector 26, appropriate signals are transmitted to controller 20, which processes the signals to determine changes in the oscillation of probe 14. Commonly, controller 20 generates control signals to maintain a constant force between the tip and sample, typically to maintain a setpoint characteristic of the oscillation of probe 14. For example, controller 20 is often used to maintain the oscillation amplitude at a setpoint value, $A_S$, to insure a generally constant force between the tip and sample. Alternatively, for instance, a setpoint phase or frequency may be used.

Commonly, actuator 24 is a piezoelectric tube (often referred to herein as a "piezo tube") or flexure that is used to generate relative motion between the measuring probe and the sample surface. A piezoelectric tube is a device that moves in one or more directions when voltages are applied to electrodes disposed inside and outside the tube. Actuators may be coupled to the probe, the sample, or both. Most typically, an actuator assembly is provided in the form of an XY actuator that drives the probe or sample in a horizontal, or XY plane and a Z actuator that moves the probe or sample in a vertical or Z direction.

AFMs can be designed to operate in a variety of modes, including contact mode and oscillating flexural mode. In an oscillation "flexural mode" of operation the cantilever oscillates generally about a fixed end. One flexure mode of operation is the so-called TappingMode™ AFM operation (TappingMode™ is a trademark of the present assignee). In a TappingMode™ AFM, the tip is oscillated flexurally at or near a resonant frequency of the cantilever of the probe. When the tip is in intermittent or proximate contact with the sample surface, the oscillation amplitude is determined by tip/surface interactions. Typically, amplitude, phase or frequency of this oscillation is kept constant during scanning using feedback signals, which are generated in response to tip-sample interaction. These feedback signals are then collected, stored, and used as data to characterize the sample.

As metrology applications demand greater throughput, and as the desirability of using SPM in a wide variety of applications requiring sub-micron measurements continues to grow, improvements to data acquisition using SPM have become necessary. Wafer analysis in the semiconductor industry is one key application. In general, chip makers want to measure structures (e.g., lines, vias, trenches, etc.) having critical dimensions (CDs), such as width of interconnect lines, contacts, trenches, etc., that are 90 nm and below. In this regard, "bottom CD" metrology is particularly interesting to semiconductor customers. Semiconductor device manufacturers often fabricate logic elements such as processors and in doing so want to measure the width of the gate structure, a fundamental element of a transistor and the basis for silicon based logic elements. The ITRS (International Technology Roadmap for Semiconductors) specifies that the bottom CD of semi features such as the gate is a very important parameter that must be controlled to within a few nanometers of uncertainty (with the range decreasing every year), or the resultant transistors will not operate as designed. Therefore, the ability to measure bottom CD accurately and precisely can define whether AFM has sufficient value to many potential customers. As a result, improvements in CD-AFM have become necessary.

When analyzing structures at such small scale, the corresponding measurements require uniformity control and must be able to accommodate high volume production environments. In this regard, one advancement has been in the area of automated AFMs which greatly improve the number of samples that may be imaged in a certain time frame by minimizing expert user tasks during operation. Instruments for performing automated wafer measurements are varied, but AFM offers a unique solution by providing, for example, the ability to perform high-resolution multi-dimension (e.g., 3-D) imaging. Some instruments, like the Dimension X automated AFM offered by Veeco Instruments, have proven 200 mm and 300 mm automation platforms.

Figure 2:
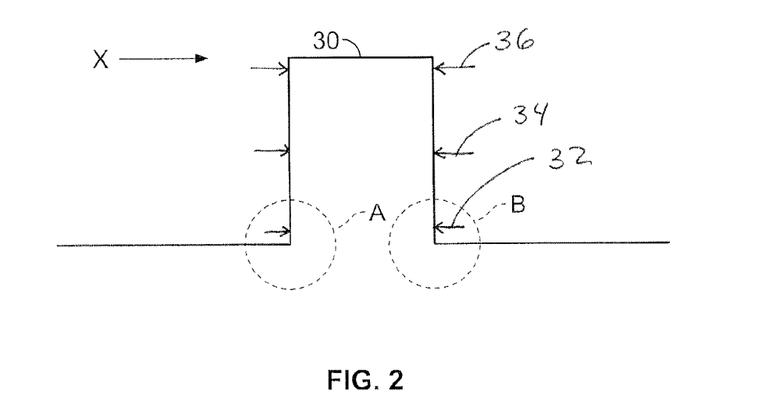
FIG. 2 is a schematic front elevational view of a line formed on a semiconductor wafer.

According to one type of oscillating mode operation particularly applicable to imaging semiconductor samples, known as CD mode, a critical boot-shaped tip is employed to measure critical dimensions of the individual batch processed semiconductor structures. In CD mode, operational parameters of the AFM operating in an oscillating mode are modified to accommodate sharp transitions in topography associated with different device features including, for example, lines, trenches, vias, etc. Notably, CD mode typically provides a two-dimensional servo (the standard Z servo used in an oscillating mode such as TappingMode™ AFM, as well as an X servo to accommodate sharp transitions), essentially maintaining the servo direction substantially orthogonal to the sample surface. FIG. 2 illustrates an exemplary line 30 having flat-to-sidewall transition regions A and B. Transition A shows a rising edge, i.e., an upwardly extending sidewall transition when scanning in the direction marked "X", while Region B corresponds to a falling edge. Often, features are scanned in both directions as part of trace/re-trace scanning. The rising and falling nature of the transition of the sample reverses for these scans. Note that transitions referenced herein indicate structural transitions (such as a flat-to-sidewall transition of a semiconductor line) as opposed to other types of transitions that may be measured with an AFM, such as material type.

A schematic version of a tip 40 of a probe device is illustrated in FIGS. 3A-3E. Tip 40 includes a boot-shaped distal end 42 having feet portions 44, 46 extending generally orthogonally to a main axis "A" of the tip. Notably, tips such as CD tip 40 are typically batch fabricated from a semiconductor wafer, but any tip suitable for imaging such features could be used. Also, an AFM operating in CD mode may be referred to herein as CD-AFM.

Again, what is shown in FIGS. 3A-3E is only the tip of the probe device scanning a flat-to-sidewall transition of a sample 48, with the base and cantilever of the probe device not shown. Notably, the shape of the CD tip, i.e., substantially "boot shaped", allows the AFM to sense transitions in the sample surface. However, due to the dynamics of the system, including limitations associated with the scanner, information regarding these transition regions is often difficult to obtain with standard CD mode AFM. Namely, when operating the AFM at high speeds, even if the bandwidth of the servo scanner is sufficient to respond to a command indicative of tip contact with a transition wall, the inertia of the scanner after the system instructs the scanner to stop scanning (in what as shown as the "X" direction) causes the tip 40 to be driven further toward sidewall 54 of sample 48. FIGS. 3A-3E highlight how these limitations results in either biased or lost information regarding sample 48 in the transition region 50.

Figure 3A:
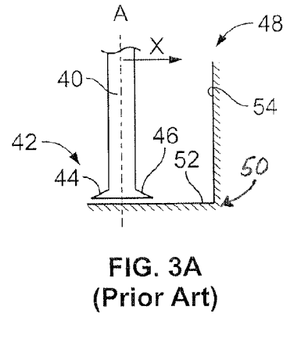
FIGS. 3A-3E are schematic side elevation views of a CD tip engaging a sample surface and scanning the sample surface, including a transition region defined by a sidewall, with FIG. 3E illustrating the data produced thereby with this prior art method.
Figure 3B:
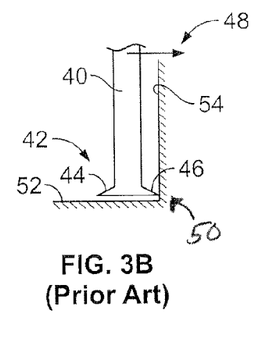
Figure 3C:
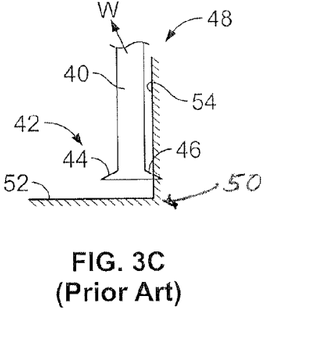

Referring initially to FIG. 3A, a tip 40 having a distal end 42 is introduced to a flat portion 52 of sample 48 and is scanned in a direction marked "X" along a scan line. In this case, sample 48 includes a semiconductor line defining a flat-to-sidewall transition 50 having an upwardly extending sidewall 54. As tip 40 scans flat portion 52, the CD-AFM reliably images the sample surface. Thereafter, when tip 40 contacts sidewall as shown in FIG. 3B, the CD-AFM will detect a decrease in the amplitude of oscillation of the probe (e.g., the RMS amplitude of oscillation may go substantially to zero) as distal end 42 contacts sidewall 54, which will operate to cause the controller to generate a signal that is transmitted to the scanner to stop and, in this case, pull up the probe in an attempt to reestablish the setpoint amplitude of oscillation. Alternatively, of course, the sample could be moved depending on the particular scanner arrangement. In this case, typically, tip 40 will stick and the feedback loop (25 in FIG. 1) will be fed signal indicating that the probe needs to be pulled away from the feature being imaged as shown in FIG. 3C. Although the feedback loop or servo command signal to the scanner instructs the scanner to stop, the scanner continues to carry the tip further towards the sidewall 54, as noted above, thus causing poor tracking of the flat-to-sidewall transition. The scanner then attempts to withdraw the tip from the feature being imaged as shown with the arrow marked "W" in FIG. 3C. At some point, typically 10-20 nm up sidewall 54, tip 40 breaks free of sidewall 54.

Figure 3D:
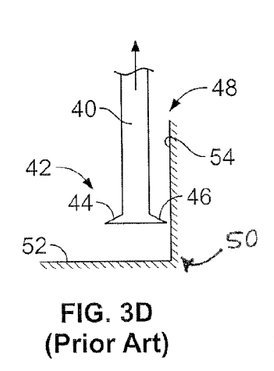
Figure 3E:
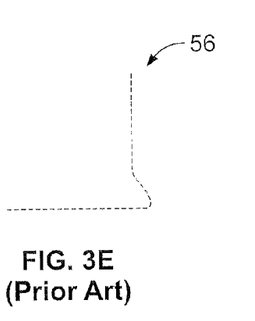

In this CD mode, the control parameters of oscillating the tip relative to the sample surface are modified to scan sidewall 54 of sample 48 as shown in FIG. 3D. In doing so, however, data is distorted in the flat-to-sidewall transition region given the fact that the system pulls tip 40 upwardly relative to sidewall 54 10-20 nm without taking any data, or alternatively, recording biased data associated with continued movement of scanner (and thus tip 40). This missing or biased data is an artifact in the AFM data and is often referred to as "notching". This notching phenomenon is illustrated in FIG. 3E, which shows a schematic image 56 generated using conventional CD mode illustrated in FIGS. 3A-3D. Clearly, the notching shown in FIG. 3E is not completely representative of the flat to sidewall transition. Notably, this information is of significant importance to many customers, including semiconductor manufacturers as they attempt to evaluate sample parameters such as line width roughness (LWR) all the way down to the base of the structure.

Figure 4:
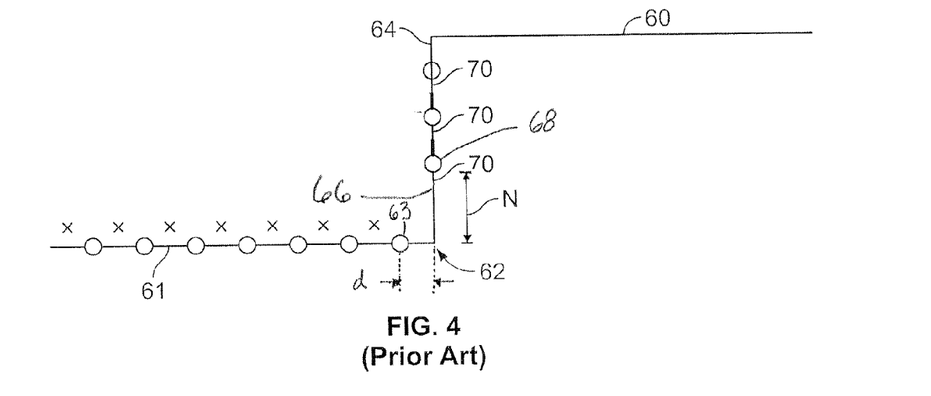
FIG. 4 is a schematic illustration of imaging a sample surface in CD mode, showing notching of the data produced on a sidewall, appropriately labeled "prior art"

A more specific illustration of CD mode operation when imaging a feature with a large transition, such as a line of a semiconductor device (30 in FIG. 2), is shown schematically in FIG. 4. Notably, probe motion is described herein, but depending upon the scanner implementation, the sample and/or the tip may be moved.

FIG. 4 illustrates data taken by a conventional CD AFM on a sample 60 where "O's" indicate contact between the tip and sample, for instance, where the RMS amplitude of oscillation goes to zero. At a transition region 62, the scanner is instructed to stop while the momentum of the scanner continues to drive the tip (not shown in FIG. 4) toward a sidewall 64. The tip is served away from the sidewall and moves to a point 68 which may be recorded as a data point as the probe, and specifically the tip, is brought into contact with sidewall 64. In the regions marked 70 in which the tip separates from the sample, in particular sidewall, and the scanner pulls the probe upwardly, no data is typically recorded by the AFM. Most often, the data generated by the "O's" is used to interpolate the data in-between to recreate the vertical sidewall when generating an image of the sample surface. This results in an artifact that is often called "notching." Though the sidewall can be imaged in this fashion and the data can be interpolated to reasonably accurately represent sidewall 64, the data missing in the region marked "N" still is unacceptable for some applications, i.e., either biased or completely missing causing the above-described "notching" problem. As a result, conventional AFM operation using a CD algorithm required improvement, especially when imaging transition points of features.

To overcome this notching problem, several techniques have been employed. First, when performing AFM metrology, including, for example, in CD mode, there is always a tradeoff between rapidly scanning fast and accurate tracking of the sample, which is in part dictated by the structural bandwidth or closed loop bandwidth of the actuator. Because the response to commanded inputs typically is not immediate, as noted previously, and the momentum of the scanner cannot be halted immediately, the notching problem always remains an issue. However, if the speed of the scan is reduced, the notching effect can be minimized. However, by reducing the scan speed, other issues arise. First, scanning at a slower speed causes the system to be susceptible to stage drift, such as that due to thermal conditions. Secondly, scanning slower means scanning fewer samples per hour. Hence, faster AFM not only provides more accuracy and precision due to the fact that the system is then less susceptible to stage drift and other similar conditions that can compromise the acquired data, it also includes the inherent benefit of being able to image more samples per hour. In the end, because many customer applications require that the associated metrology, including semiconductor metrology, be measured in dollars per measurement, scanning slower can become unacceptable for some customers, to the point that AFM may not be a viable alternative to other known tools for measuring features of samples such as critical dimensions of semiconductor structures.

There are some measures that a user can take to operate an AFM at a slower scan speed, such as using a highly accurate stage and a cooled environment. However, there will always be some motion associated with stopping the scanner, such that, again, notching is nearly always a problem.

Other alternatives to scanning probe microscopy for measuring critical dimensions on semiconductor features, are scanning electron microscopy (SEM) and transmission electron microscopy (TEM, or STEM for scanning). SEM, and even more so TEM, are very high accuracy instruments. However, these techniques are extremely expensive and often difficult to use given the amount of preparation work of the sample required before conducting the measurements. For example, when imaging a semiconductor wafer, SEM and TEM will typically require cutting the wafer at specific locations while preserving structures that are intended to be imaged. This preparation work can take as much as a day or two, and thus will typically slow down the semiconductor fabrication process to analyze the one sacrificial wafer used to analyze the viability of continuing to process that batch of wafers.

Scatterometry is used in the semiconductor fabrication environment, for instance, to measure critical dimensions of sample features, including base dimensions of lines, etc. Scatterometers are extremely fast and can image the types of samples contemplated herein faster than SPMs. Nevertheless, though notching typically is not the problem it is with, for example, AFM, scatterometry includes its own set of limitations. Scatterometry is an indirect measurement that uses data acquired by CD-AFM or CD-SEM to build a library of data that is compared to the measurements obtained by the scatterometer. Techniques such as CD-AFM, SEM, and TEM are thus sometimes referred to as reference metrology systems (RMSs) in that they are tools used by other tools that provide indirect measurements of sample features. Scatterometry, in general, operates by generating a signal that is directed towards a target, and sensing how much of that signal returns from the target after interacting with the target. By comparing that data to a library of data generated by, for example, a CD-AFM, a representation of the target can be generated. Overall, this feature of scatterometry means that significant time-consuming and laborious calibration is required to be able to image samples. A direct method of imaging sample features is therefore preferred.

Moreover, scatterometers only produce average data and thus cannot produce a true RMS reading or a standard deviation of, for example, line width. CD mode AFM, on the other hand, is an adaptive scan that is able to detect in real time what the tip of the AFM is interacting with. Scatterometry is also dependent on properties of the sample due to the fact that different sample properties will interact differently with the source signal generated by the scatterometer.

In sum, the art of high precision and high speed sample measurement, particularly in the semiconductor fabrication environment, was in need of a metrology tool that is capable of a direct measurement of sample properties, such as critical dimensions of semiconductor features, with a high degree of accuracy and repeatability. More particularly, a CD-AFM capable of imaging transition regions, such as the sidewalls of a line, at high speed and without causing artifacts such as notching in the data, was desired.

SUMMARY OF THE INVENTION

The preferred embodiments overcome the above-noted drawbacks by providing a technique of scanning samples in which sharp transitions are detected with a high degree of accuracy and then immediately re-scanned with modified AFM operation parameters to image the feature without "notching" being produced in the resultant data. In particular, as the CD tip encounters a transition region in the sample, such as a sidewall of a line, the acquired data is analyzed to determine if a severe change in slope has occurred in the data. Once confirmed, the region with the threshold level of slope change is re-scanned by withdrawing the scanner from the sample surface and then driving the tip back down onto the sample surface to re-scan the sample so as to substantially insure all details of the transition region are detected. Thereafter, the original scan data is amended using the re-scan data to correctly represent the transition region.

According to a first aspect of the preferred embodiment, a method of scanning a sample with an SPM having a probe includes scanning a surface of a sample according to at least one scan parameter to obtain data corresponding to the surface. The method also includes substantially automatically identifying a transition in the surface and re-scanning a region of the sample in response to the identified transition.

In another aspect of this embodiment, the method includes amending at least a portion of the data from the scanning step with data obtained from the re-scanning step. The amending step includes at least one of replacing at least a portion of the data and augmenting at least a portion of the data so as to substantially eliminate notching.

In a further aspect of this embodiment, the transition corresponds to a flat-to-sidewall region of the sample and is defined by a semiconductor structure.

According to yet another aspect of this embodiment, the identifying step occurs during the scanning step. Moreover, the region may correspond to the transition.

In a still further aspect of this embodiment, the identifying step includes computing a slope of the sample surface.

According to another aspect of this preferred embodiment, the slope is computed during the scanning step.

According to a still further aspect of this embodiment, the identifying step includes determining a change in the slope. Typically, a derivative of the data will be computed.

In another aspect of this embodiment, the re-scanning step includes changing the at least one scan parameter and withdrawing the tip from a sidewall off the sample a selected amount, preferably less than about 10 nm.

In yet another aspect of this preferred embodiment, the re-scanning step includes changing the at least one scan parameter including rate of scanning step by reducing the scan rate.

In another aspect of this embodiment, the transition is defined by a sidewall and the re-scanning step includes withdrawing the probe from the sidewall less than about 10 nm.

According to a still further aspect of this embodiment, the at least one scan parameter corresponds to AFM operations in CD mode and is one of a rate of the scanning step and at least one direction of scanning.

According to another aspect of this preferred embodiment, the method scans five measurement sites of a semiconductor wafer in less than about ten minutes for slow applications to three minutes for faster measurement applications. In particular, the preferred embodiments enable a high rate of scan velocity without the user having to reduce the scan speed on a global basis and without compromising the SPM's ability to accurately track the sample when encountering a discontinuity.

According to a second aspect of the preferred embodiment, a scanning probe microscope (SPM) includes a scanner that provides relative motion between a probe of the SPM and a sample. The SPM also includes a controller that generates control signals indicative of interaction between the probe and the sample and a computational device that identifies a transition region of the sample based on the control signals. The controller transmits controls to the scanner so as to re-scan the transition region.

According to yet another aspect of this embodiment, the transition region is identified by determining a slope of the sample surface using data produced based on the control signals, and computing a change in the slope.

In a still further aspect of this embodiment, the computational device is employed to amend the sample surface data using re-scan data produced upon re-scanning the transition region by either augmenting or replacing the sample surface data.

According to another feature of the preferred embodiments, a method of scanning a sample with a scanning probe microscope having a probe includes scanning a surface of the sample to obtain data corresponding to the surface, the surface including at least one transition. The method also includes obtaining a measurement representative of the surface of the sample within an error distance from the transition wherein the error distance is limited substantially only by the geometry of a tip of the probe.

According to another aspect of this embodiment, the sample includes a semiconductor material and the transition is a flat-to-sidewall.

According to a further aspect of this embodiment, the measurement includes a plurality of measurements including a bottom CD measurement, a middle CD measurement, and a top CD measurement. The measurements have a repeatability that does not substantially vary among the measurements.

In another aspect of this embodiment, the measurement has a repeatability of less than about 1 nm, 1 sigma, and more preferably, a repeatability that is less than about 5 Angstroms, 1 sigma.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

The preferred embodiments are directed to a method and corresponding apparatus for high speed imaging sample features, particularly those characterized by transition regions, such as that encountered when imaging a flat-to-sidewall region of a feature of a semiconductor sample. By detecting the flat-to-sidewall transition, and confirming the same, the sample in that region is then re-scanned to accurately measure the transition, including the entire base of the region. The method may operate in conjunction with a control method associated with operating an atomic force microscope in the above-described CD mode or a similar mode. Notably, the method operates independent of the specific dynamics of the scanner by re-scanning regions of the sample that typically would cause missing or biased data, i.e., notching, when imaging the sample using standard CD mode.

Turning initially to FIGS. 5A-5D, high speed operation of an AFM according to a preferred embodiment of the present invention referred to herein as CD Transition Re-scan Algorithm (CDTRS) operation is illustrated. Notably, FIG. 5A corresponds directly to FIG. 3D which shows prior art motion of the probe in the known CD mode after a tip 40 re-engages the sample sidewall, thus causing notching in the 10-20 nm vertical region of the sidewall. At that point, in CD mode the probe attempts to image the sidewall, as discussed previously. In the case of this preferred embodiment, however, moving from FIG. 5A to 5B rather than continuing up the sidewall, tip 40 is withdrawn from sidewall surface 54 a selected amount (marked "P" in FIG. 5B), thus allowing the AFM to accurately re-scan the entire surface of the transition region of the sample feature. Notably, though scanner motion of the tip is described for convenience, motion of the tip and/or sample may be employed depending on the chosen scanner configuration.

Though a perfect right angle between the flat-to-sidewall transition 50 is shown in these schematic drawings, most often there will be some imperfection in the fabricated line, typically down at the base. Therefore, in the preferred embodiments, the probe is withdrawn a distance "P" sufficient to image the entire surface. Preferably, tip 40 is withdrawn less than 20 nm, and more preferably, about 5 to 10 nanometers, but again, the specific amount of withdraw will be sample and user preference dependent.

Figure 5A:
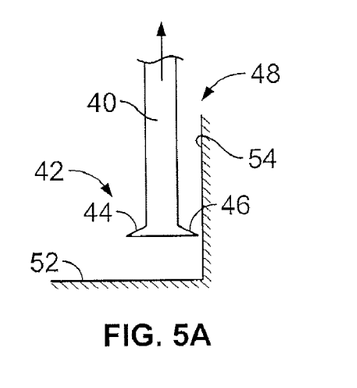
FIGS. 5A-5D are schematic side elevational views of motion of the tip according to a preferred embodiment of the present invention, including re-scanning a transition region when detected.
Figure 5B:
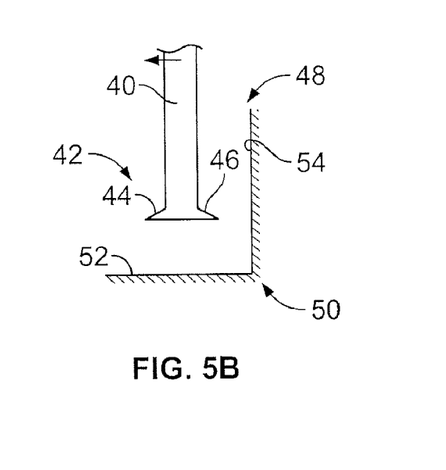
Figure 5C:
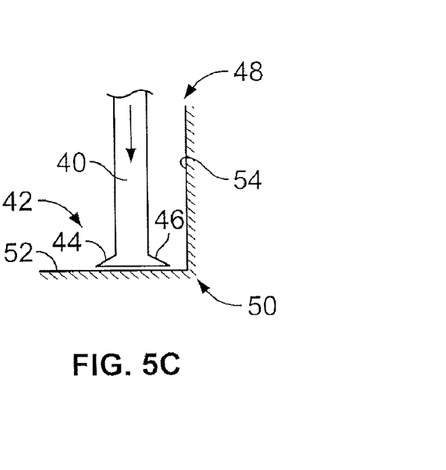
Figure 5D:
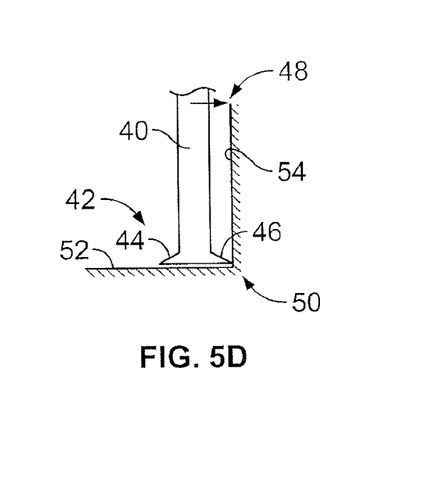
Figure 5E:
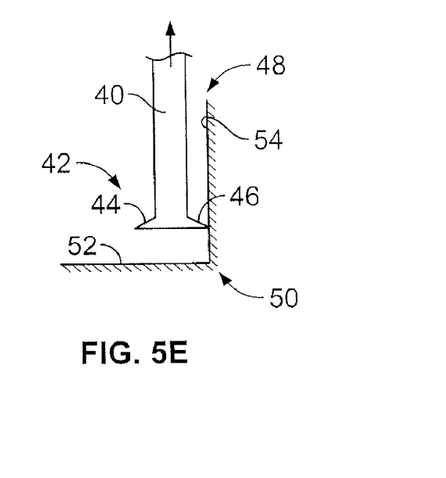
Figure 6:
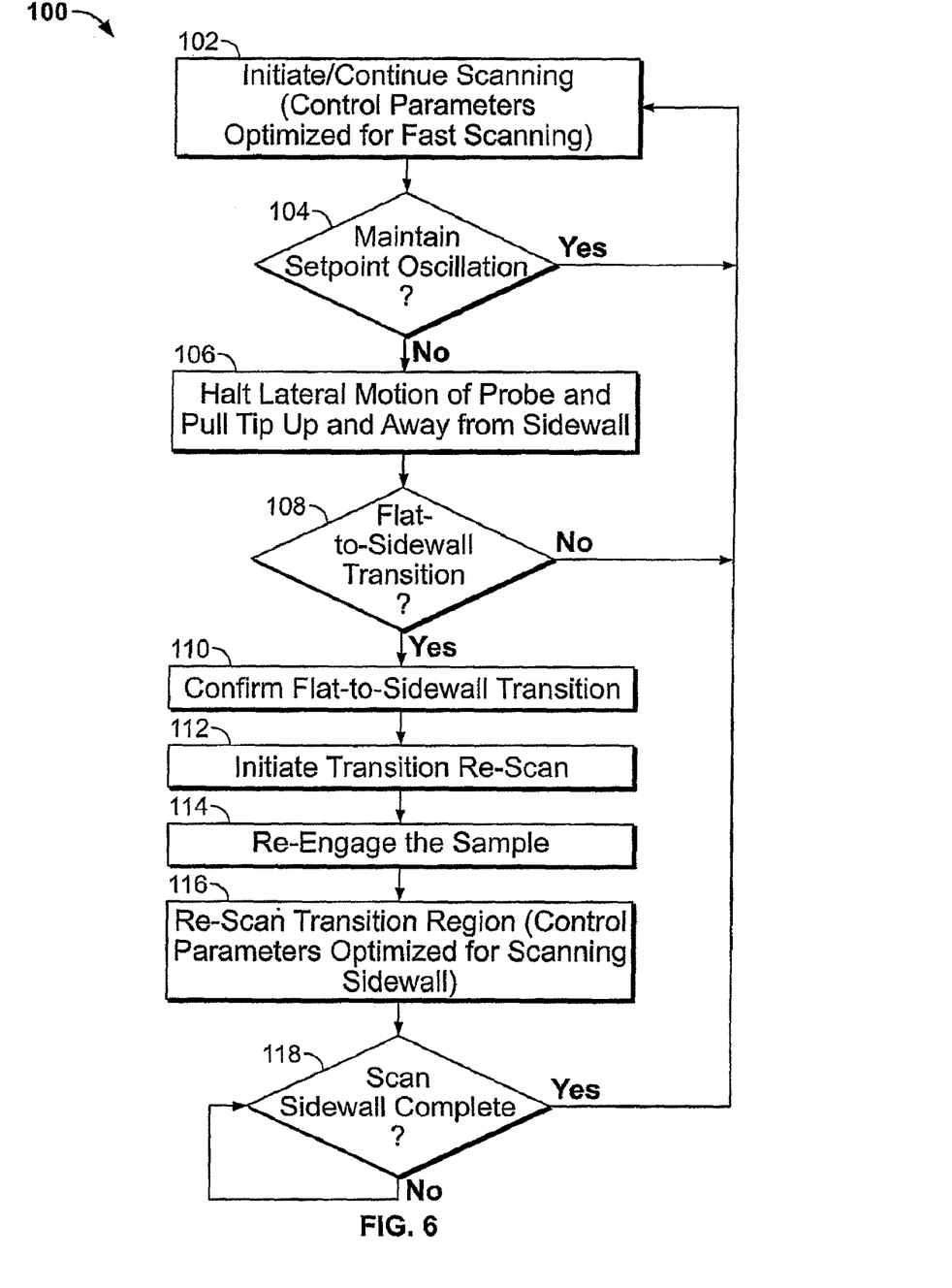
FIG. 6 is a flow diagram illustrating an algorithm for scanning a transition region of a sample to be imaged as shown in FIGS. 5A-5D.

Once withdrawn as shown in FIG. 5B, tip 40 is reintroduced to flat portion 52 of sample 48, as shown in FIG. 5C, to re-scan transition region 50. This re-scan is shown in FIG. 5D which illustrates tip 40 scanning flat portion 52 and then contacting sidewall 54 to collect data regarding the transition region 50. As discussed in further detail below, the scan parameters are optimized for this re-scan, including reducing the scan speed during the fast scan, to minimize the chance that the resultant data, especially around transition region 50, is biased or missing. Once the transition region is re-scanned, the tip is moved up sidewall 54 to image the sidewall with AFM operating parameters substantially optimized for sidewall scanning, similar to standard CD mode operation, and as illustrated in FIG. 5E. FIG. 6 outlines the details of this procedure.

FIG. 6 illustrates a control algorithm 100 according to a preferred embodiment. Preferably, method 100 automatically detects a discontinuity in sample surface data and controls the AFM to substantially insure that the surface is accurately represented by the image data. The algorithm is described as scanning a transition region of, for example, a leading edge of a line fabricated on a semiconductor wafer when scanning from left to right as shown in FIGS. 5A-5E; however, the preferred embodiments have applicability to scanning all types of samples and sample characteristics, semiconductor or otherwise. In Block 102, the AFM controller initiates scanning of the sample by introducing the tip of the probe to the sample surface and providing relative scanning motion between the tip and the sample (FIG. 3A). Preferably, the control of the probe/sample interaction is optimized for high speed scanning while algorithm 100 determines whether an oscillation setpoint (for example, an amplitude, phase or frequency of oscillation) is maintained in Block 104. High speed scanning, in this context, preferably refers to scanning at an SPM linear scan velocity or rate of between about 100 nm/s to several hundred nanometers per second, for example, to image 10 to 20 wafers per hour, with each wafer having about five (5) measurement sites. Differing standards exist for the number of measurements per sample, with five, nine and twenty-one measurements (defined as AFM scans) per sample typically being used. Though samples per hour can vary, measurements per hour can remain essentially constant. For instance, AFMs are often able to obtain topographical images of samples at about approximately 125 measurements per hour on 200 mm and 300 mm wafers.

More generally, high speed scanning can be defined as the maximum velocity which the actuator system can move the probe along the sample surface while maintaining probe oscillation at the setpoint (e.g., RMS amplitude) with acceptable error. In other words, how effective is the AFM at controlling the RMS amplitude to track the sample surface. In this regard, linear scan speed is often dependent on the varying topographical features of the sample, for example, a flat, a sidewall or a top middle portion of a line.

If the setpoint oscillation is maintained, data is collected and recorded and scanning of the sample continues as control returns to Block 102. Notably, it is the control signal that is used to maintain probe oscillation at the setpoint that provides an indication of at least one sample property thereby providing sample surface data, e.g., topography. If the setpoint oscillation is not maintained, relative lateral motion between the probe and sample is stopped by the controller by transmitting an appropriate signal to the scanner. The two-dimensional servo employed by CD mode pulls the tip up and away from the sidewall, typically at an angle of about 10-15°, and more preferably, of about 11-13°, in Block 106 (see "W" in FIG. 3C). An indication that a sidewall may have been contacted is provided if the setpoint oscillation still cannot be achieved by moving the tip up and away from the sidewall (e.g., by evaluating the magnitude of the notching data artifact). Once the tip starts scanning up a sidewall (after the tip has been freed from the sidewall), the algorithm allows the scan to continue an additional 10-20 nm to ensure that the scan has encountered an actual sidewall, and not a particle on a flat portion of the sample. For instance, the tip may remain stuck to the sample surface while the controller/algorithm attempts to return probe oscillation to the setpoint amplitude.

Most often, the tip must be moved upwardly 10-20 nanometers in "Z" before the CD mode AFM is able to determine that a sidewall has been contacted in Block 108; for instance, once the tip breaks free of the sample sidewall. By monitoring local slope, the system can determine if a sidewall has been encountered, for example, if the XZ scanner moves the probe vertically a certain amount. This vertical distance can be set as a predetermined parameter and may be designed to be selected by the user. For some of the applications contemplated by the preferred embodiments, this distance is in a range of about 10 to 20 nm. In the end, local slope operates to determine scanner step direction and servo direction to maintain probe oscillation at the setpoint, which in turn, impacts the speed at which the AFM can image the sample.

As discussed in detail previously, when a transition is encountered, a scanning control signal instructs scanning to stop (i.e., movement of probe and/or sample in "X", for instance, see FIG. 2), but scanner inertia causes further movement of the tip in "X" such that relative tip/sample motion in "X" persists. As a result, it is possible that no data points are acquired during that 10-20 nanometer, in this case vertical, stretch of the sample surface. Alternatively, however, data may be recorded as the tip continues to move "into" the sample, yielding data points that are actually "inside" the sidewall of the semiconductor structure. Recording Z position as a function of scanner position as it continues to move in the scanning direction after the tip contacts the sidewall causes the above-described phenomenon known as "notching" (FIG. 3E). In the end, data is either missing or it is biased, and thus unreliable.

At this point, standard CD mode AFM begins to scan the sidewall with control parameters optimized for scanning the sidewall (e.g., scan direction, servo direction, etc.), albeit with 10-20 nm of corrupted data. CDTRS algorithm 100 operates to overcome this limitation.

Referring again to FIG. 6, if algorithm 100 determines that a flat-to-sidewall transition has not occurred in Block 108, control returns to Block 104 and high speed scanning is continued to image the sample by maintaining oscillation of the probe at the setpoint. If, however, a flat-to-sidewall transition is detected, confirmation of the transition is made in Block 110 and a re-scan of the transition region is initiated in Block 112. The way in which the preferred embodiments automatically confirm whether a flat-to-sidewall transition has occurred is as follows. Preferably, using the history of acquired data points, algorithm 100 uses a computational device to monitor the slope of the sample surface by, for example, monitoring pairs of data points immediately preceding the current scan location. Alternatively, the system may dither the tip laterally and monitor the amplitude modulation that results as the tip is brought into and out of contact with the sample sidewall or filter past scanner positions, as discussed in U.S. Pat. No. 5,283,442, which is expressly incorporated by reference herein. Computational device can be a computer, such as computer/controller 20 of AFM 10 in FIG. 1, but the device may also be a digital signal processor (DSP), a microcontroller, a field programmable gate array (FPGA), a programmable logic device or any other device capable of performing the described analysis.

Based on the slope of the data collected during the scan, algorithm 100 then determines the change in slope that occurs during the scanning operation. It is the change in slope, $\Delta m$, that is used in the preferred embodiments to indicate a flat-to-sidewall transition. Slight fluctuations in slope are typical and do not indicate a flat-to-sidewall transition, while a transition from, for example, zero slope (to indicate a flat region) to a slope of "1" (to indicate a vertical region) will indicate that a transition region has been encountered. Also, if for example the RMS amplitude briefly goes to zero at a certain location, as it often does as the tip interacts with the sample as described previously, analyzing slope substantially insures that only a true flat-to-sidewall transition is present.

Preferably, the change in slope is automatically determined by calculating the derivative of the slope information being computed using the data collected during the scan. In this case, the slope change is drastic at a true flat-to-sidewall transition when operating in traditional CD mode because, as noted previously, valid data points when notching occurs are often times about 10-20 nm apart in "Z" at substantially the same scan or "X" location (valid data points being those data points not biased by notching). Alternatively, the transition may be detected by identifying an error in the data, identifying a region characterized by too few data points or insufficient data density, identifying bad tracking of the surface, etc.

At that point, with the original scan of the transition complete (for example, with missing or biased data collected and indicative of notching) a transition re-scan is preferably automatically initiated in Block 112. This re-scan typically is accomplished by pulling the tip laterally away from the sidewall by serving the position of the probe in "X" (as shown in FIG. 5B) and then re-engaging the sample in Block 114. Preferably, the tip is withdrawn from the sidewall by about 5-10 nanometers to insure that all information that may have been lost in the transition region can be re-scanned. It is notable that CD mode can include a two-dimensional servo operation in which the tip position is served not only in Z but also in the lateral or X direction, thus accounting for the preferred 11°-13° withdrawal of the tip from the sidewall and re-engagement of the surface. After the sample is reengaged in Block 114, a re-scan of the transition region is performed in Block 116. To do so, the control parameters are optimized for scanning the sidewall. For instance, the lateral (X) speed at which the scan is conducted is lowered to make sure that as little information in the transition region is lost as possible. The scan and servo direction may also be modified. By optimizing the servo direction, the scanner motions during the servo portion and scan portion are optimized for scanning up a sidewall. Doing so slows down scan speed in the lateral (X) direction, but allows for the capture of un-biased sidewall data from the very beginning of the sidewall scan. In this regard, the servo direction is typically perpendicular to the sample surface, while the scan direction is typically parallel to the sample surface. When scanning a flat region, the servo direction is primarily in the Z direction as the tip traverses the sample surface. On the other hand, when a sidewall is scanned, the tip position is served laterally by moving the oscillating probe in X in an attempt to keep tip-sample interaction such that the setpoint oscillation is maintained. In Block 118, algorithm 100 determines whether the sidewall scan is complete, typically by detecting that the probe is oscillating freely. If not, the system continues to scan the sidewall using the optimized sidewall scanning control parameters set in Block 116. If, on the other hand, the sidewall has been scanned, control is returned to Block 102 to continue fast scanning the sample surface.

Figure 6A:
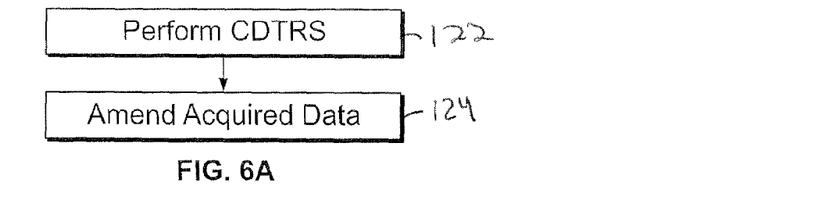
FIG. 6A is a flow diagram illustrating a method of improving the quality of an SPM image according to a preferred embodiment.

Either during AFM operation or once the sample has been scanned, the collected data is amended to essentially remove any notching of the data using the re-scan data. In particular, the data from the original scan is preferably either augmented with the re-scan data or replaced by the re-scan data. FIG. 6A illustrates this operation 120. An algorithm, which may be part of algorithm 100, includes performing CDTRS (Blocks 102-118 of algorithm 100) to generate original data and re-scan data (if any) in Block 122. Then, in Block 124, the original data is amended, thus substantially removing any inaccuracy, for example, due to notching.

Figure 7:
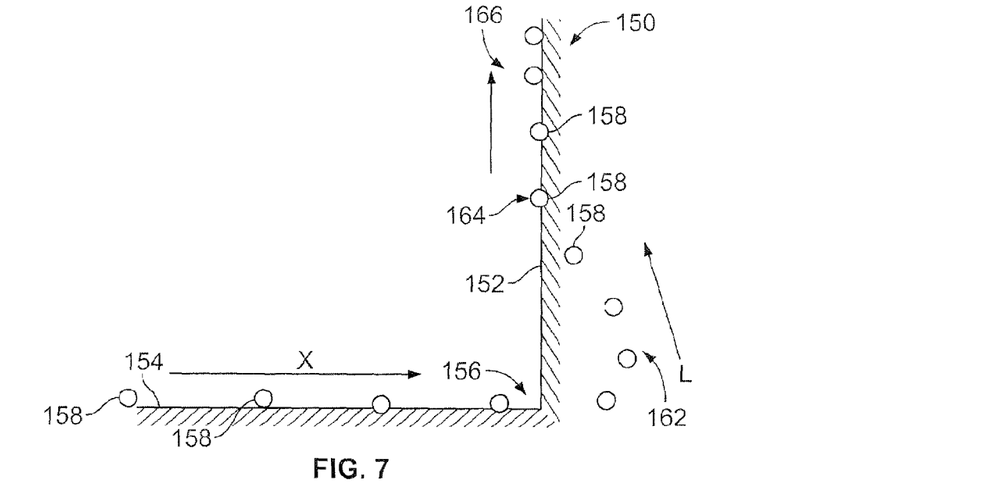
FIG. 7 is a schematic side elevational view of "notching" resulting according to standard CD mode microscopy.
Figure 8:
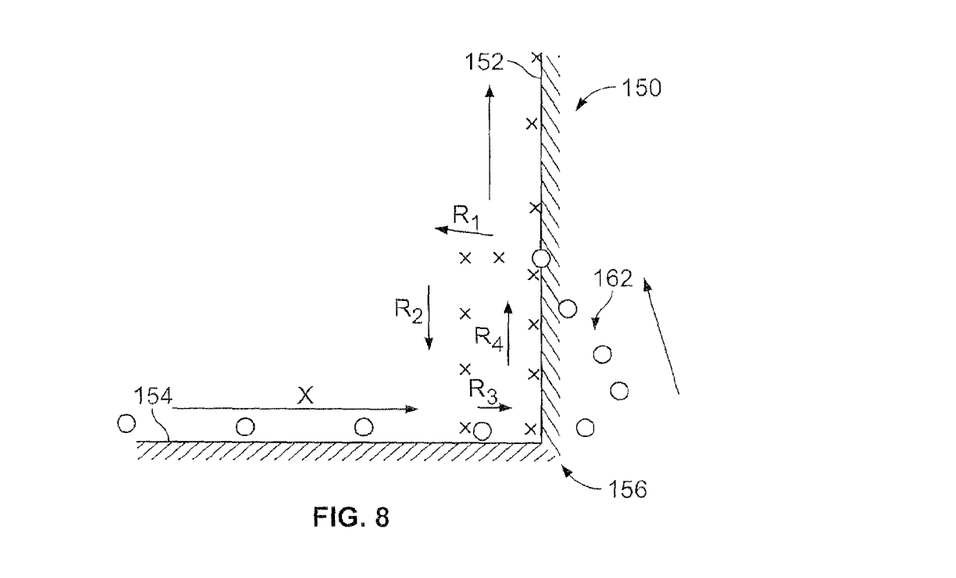
FIG. 8 is a schematic illustration of data obtained using the algorithm of the preferred embodiment overlaid on data acquired by an AFM operating in standard CD mode.

To schematically illustrate the difference between the data collected during standard CD mode AFM and the sidewall scanning algorithm 100 of the preferred embodiments, i.e., CDTRS, reference is made to FIGS. 7 and 8. Referring initially to FIG. 7, a series of circles 158 indicate actual XZ scanner motion while initially scanning the flat-to-sidewall transition with the corresponding tip/sample interaction possibly yielding a collected data point. As scanning occurs from left to right in the direction of the arrow marked "X", data points corresponding to the flat part 154 of the surface of a sample 150 effectively track the sample surface to image that part of the sample. Thereafter, at about a transition region 156 of sample 150 (a sidewall 154 of the sample, for example, a semiconductor feature such as line), the tip (not shown) contacts sidewall 154 and may get stuck to the sidewall as, for example, the RMS amplitude of oscillation substantially goes to zero, and in any event much less than the setpoint amplitude of oscillation. As the controller of the AFM attempts to reestablish the setpoint amplitude of oscillation at and after the transition region 156, the controller lifts the probe up and back as shown by the arrow marked "L." Again, this motion of the tip is typically about 13° from vertical, which in this case is defined by sidewall 152. As the controller pulls the tip up and back in an attempt to free the tip from the sidewall the scanner continues to move in the direction marked "X" and data may be acquired as that shown in region 162. It is this data that results in notching, causing an incorrect image of sidewall 152 to be produced when using standard CD mode AFM. It is at about point 164 that the tip frees itself from the sidewall and the CD mode algorithm modifies the control parameters sidewall scanning of sample 150, as discussed previously. Thereafter, sidewall scanning is performed with proper serving to obtain the data point shown at region 166.

In the end, it is the biased data at the transition that many users of SPM metrology tools find unacceptable. On the other hand, in FIG. 8, the notching problem is essentially eliminated. In this case, data is collected as described above in connection with FIG. 7, however, at about point 164 of the collected data, algorithm 100 confirms a flat-to-sidewall transition by computing changes in slope and determining that a sidewall has been encountered, as described above. In response, an appropriate control signal is transmitted by the controller to the scanner to re-scan transition region 156, as shown by the data points illustrated using a series of X's. More particularly, the tip is withdrawn from the sidewall in a direction $R_1$ (slightly up and back), again about 5-20 nm in X as described previously, and then reintroduced to the sample surface by moving the tip downwardly towards the sample in segment $R_2$. Thereafter, re-scanning begins in the direction marked $R_3$ in which the control parameters are optimized for scanning a sidewall including at the base of the transition region. The algorithm then continues to operate to collect data as the tip progresses up the sidewall in direction $R_4$. In this way, algorithm 100 operates to accurately image the entire sidewall including the transition region from flat portion 154 of sample 150 to minimize the effect of notching even when imaging at high bandwidth, e.g., high SPM scan velocity.

Figure 9:
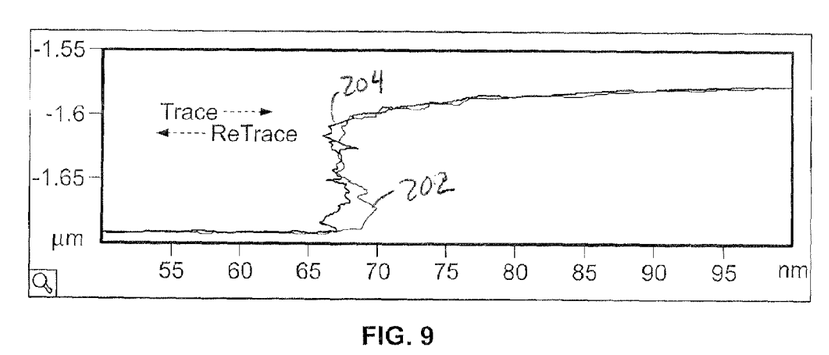
FIG. 9 is a plot of data acquired upon trace and retrace of a transition region of a sample using known CD mode.
Figure 10:
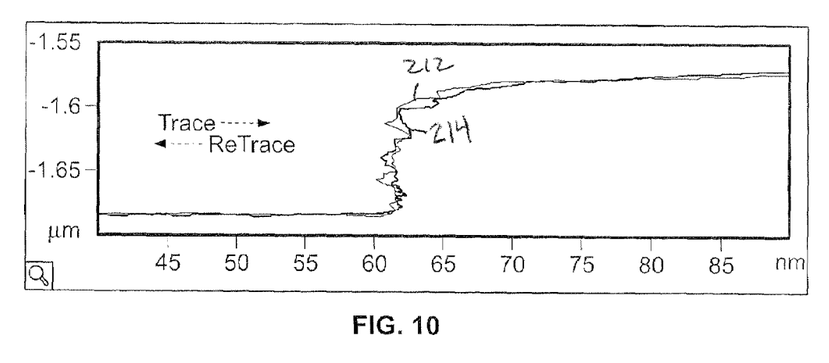
FIG. 10 is a plot of data acquired upon trace and retrace of a transition region of a sample using a preferred embodiment of the present invention.

Data acquired in CD mode and using the above-described preferred algorithm is schematically illustrated respectively in FIGS. 9 and 10. In the FIG. 9 plot 200, it is clear that, during the trace portion 202 of the AFM scan (moving from left-to-right and encountering a vertical sidewall), the notching phenomenon occurs at region 206. A retrace plot 204 using CD mode causes a similar artifact when the tip falls off the edge of the line of the semiconductor. Notably, in fact, this can cause the acquired data of the line to depict a larger top portion, similar to "notching" at the base on the trace plot. More particularly, if the scan does cause the tip to "fall off line," an algorithm may be employed to detect this event and bring the probe/tip back to the sidewall. Often, there will be several tens of nanometers of data missing at the top of the line. Modified CDTRS could be used to eliminate this missing "top" data, using slope data for instance. Turning to FIG. 10, it is clear that when using the CDTRS algorithm of the preferred embodiments, both the trace 212 and retrace 214 images of plot 210 accurately track the transition region of the sample from the flat-to-sidewall sections of a semiconductor line. In the end, the preferred embodiments are able to accurately and precisely image critical dimensions (CDs) of semiconductor features, even at the transition regions, including the bottom portion of a line, for example. As a result, customers such as semiconductor manufacturers are able to image wafers and other samples at high speeds while obtaining highly reliable data concerning sample features of highest interest, such as bottom critical dimensions and line width roughness (LWR), etc.

Because notching is essentially removed when using CDTRS, essentially the only physical limitation to precisely imaging small-scale features such as a bottom CD of a line is the geometry of the tip. In this regard, and as mentioned previously, one common type of tip for imaging CD features is a boot-shaped tip. It is this "boot" shape of the tip that can be, and most often is, reflected in the resultant AFM data, primarily due to the fact that the AFM data is obtained on a scale that is smaller than the dimensions of the tip. With CDTRS, it is essentially only this geometry that limits the precision of the measurement.

In other words, if not for the geometry of the tip, CDTRS can achieve an error distance "d" (shown schematically in FIG. 4), defined as the distance between the actual bottom transition point (flat-to-sidewall transition point of FIG. 4) and the closest resultant AFM data point (63 in FIG. 4) corresponding to the transition, of about zero. This is contrary to known techniques in view of the fact that notching and/or other similar artifacts independent of tip geometry are reflected in their acquired data, as understood in the art.

Moreover, the measurements obtained using the technique of the preferred embodiments are very repeatable. In particular, bottom CD using the present CDTRS re-scan technique has repeatability of less than 1 nm, 1 sigma, and more preferably, less than five Angstroms, 1 sigma, within the mandates of the ITRS. In addition, a valuable aspect of the present technique is that this repeatability does not substantially vary among different types of sample measurements, for example, bottom CD, middle CD and top CD of a semiconductor line (see FIG. 2, bottom CD 32, middle CD 34, and top CD 36). Again, this is primarily due to the minimization of artifacts such as notching when using the preferred embodiments.

Although the best mode contemplated by the inventors of carrying out the present invention is disclosed above, practice of the present invention is not limited thereto. It will be manifested various additions, modifications and rearrangements of the features of the present invention may be made without deviating from the spirit and scope of the underlying inventive concept.

I claim:

1. A method of scanning a sample with a scanning probe microscope (SPM) having a probe, the method comprising:
   scanning a surface of the sample to obtain data corresponding to the surface, the scanning step characterized by at least one scan parameter;
   substantially automatically identifying a transition in the surface along a scan line during the scanning step;
   stopping the scanning step along the scan line based on the identified transition:
   re-scanning a region of the sample along the scan line associated with the identified transition before continuing the scanning step along the scan line so as to image the sample surface; and
   further comprising amending at least a portion of the data obtained from the scanning step with data obtained from the re-scanning step.

2. The method of claim 1, wherein the amending step includes at least one of replacing the data and augmenting the data so as to substantially eliminate notching.

3. The method of claim 1, wherein the at least a portion corresponds to a location of the identified transition.

4. The method of claim 1, wherein the identifying step occurs during the scanning step.

5. The method of claim 1, wherein the identifying step includes computing a slope of the sample surface using the data.

6. The method of claim 5, wherein the slope is computed during the scanning step.

7. The method of claim 5, wherein the identifying step includes determining a change in the slope.

8. The method of claim 1, wherein the transition is defined by a sidewall, and the re-scanning step includes withdrawing the probe from the sidewall a selected amount.

9. The method of claim 8, wherein the selected amount is less than about 10 nm.

10. The method of claim 1, wherein the at least one scan parameter is at least one of a rate of the scanning step and a direction of the scanning step.

11. A method of scanning a sample with a scanning probe microscope (SPM) having a probe, the method comprising:

scanning a surface of the sample to obtain data corresponding to the surface, the scanning step characterized by at least one scan parameter;

substantially automatically identifying a transition in the surface along a scan line during the scanning step;

stopping the scanning step along the scan line based on the identified transition; and re-scanning a region of the sample along the scan line associated with the identified transition before continuing the scanning step along the scan line so as to image the sample surface, wherein the transition corresponds to a flat-to-sidewall region of the sample.

12. The method of claim 11, wherein the flat-to-sidewall region is defined by a semiconductor structure.

13. The method of claim 11, wherein the at least one scan parameter corresponds to AFM operation in CD mode.

14. The method of claim 11, wherein the method scans a semiconductor at an SPM scan velocity of at least about 100 nm/sec.

15. A method of scanning a sample with a scanning probe microscope (SPM) having a probe, the method comprising:

scanning a surface of the sample to obtain data corresponding to the surface., the scanning step characterized by at least one scan parameter;

substantially automatically identifying a transition in the surface along a scan line during the scanning step;

stopping the scanning step along the scan line based on the identified transition; and re-scanning a region of the sample along the scan line associated with the identified transition before continuing the scanning step along the scan line so as to image the sample surface, wherein the re-scanning step includes changing the at least one scan parameter, wherein the at least one scan parameter includes a scan rate, and the changing step includes reducing the scan rate.

16. A scanning probe microscope (SPM) comprising:

a scanner that provides relative motion between a probe of the SPM and a sample, wherein the probe interacts with the sample at a transition along a scan line;

wherein the SPM identifies the transition and in response causes the scanner to re-scan the transition so as to image the sample surface before continuing to scan the sample along the scan line; and further comprising a controller and a computational device, wherein the controller generates control signals indicative of the interaction between the probe and the sample, and wherein the computational device identifies the transition by determining a slope of sample surface data produced based on the control signals.

17. The scanning probe microscope of claim 16, wherein the computational device identifies the transition by computing a change in the slope.

18. The scanning probe microscope of claim 16, wherein the computational device amends the sample surface data using re-scan data produced upon re-scanning the transition.

19. The scanning probe microscope of claim 18, wherein the computational device either augments or replaces the sample surface data.

* * * * *